L. FINE.
METAL WHEEL STRUCTURE.
APPLICATION FILED MAY 12, 1919.
1,404,283.
Patented Jan. 24, 1922.
2 SHEETS—SHEET 1.
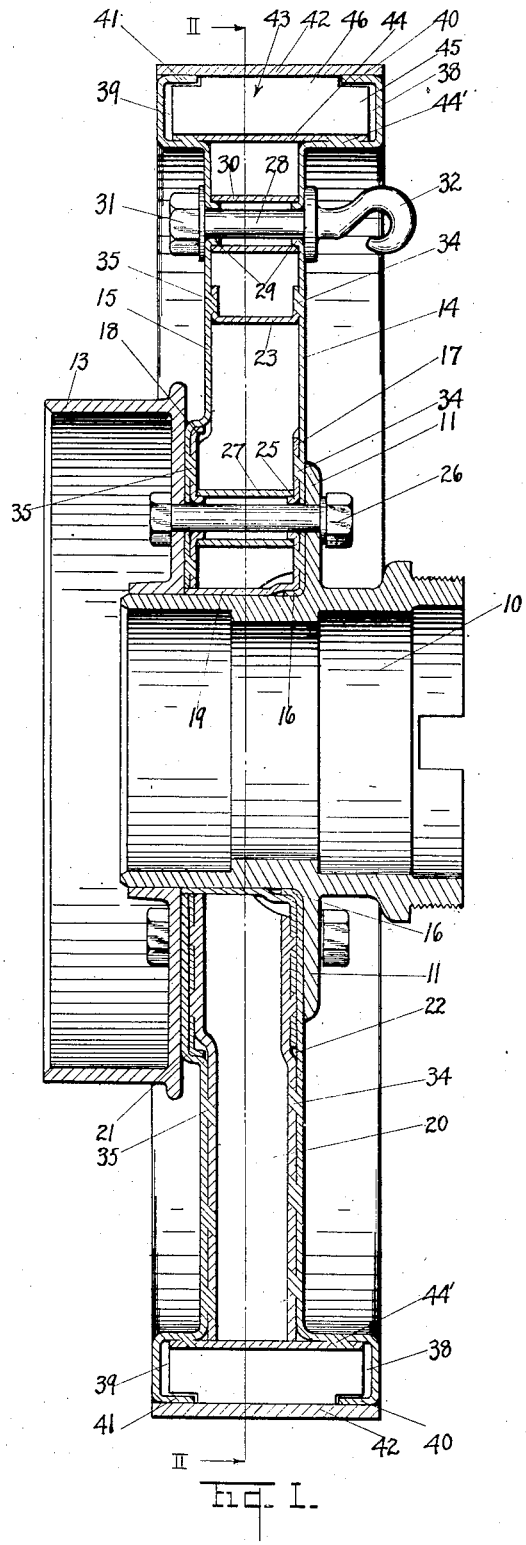
Fig. I.
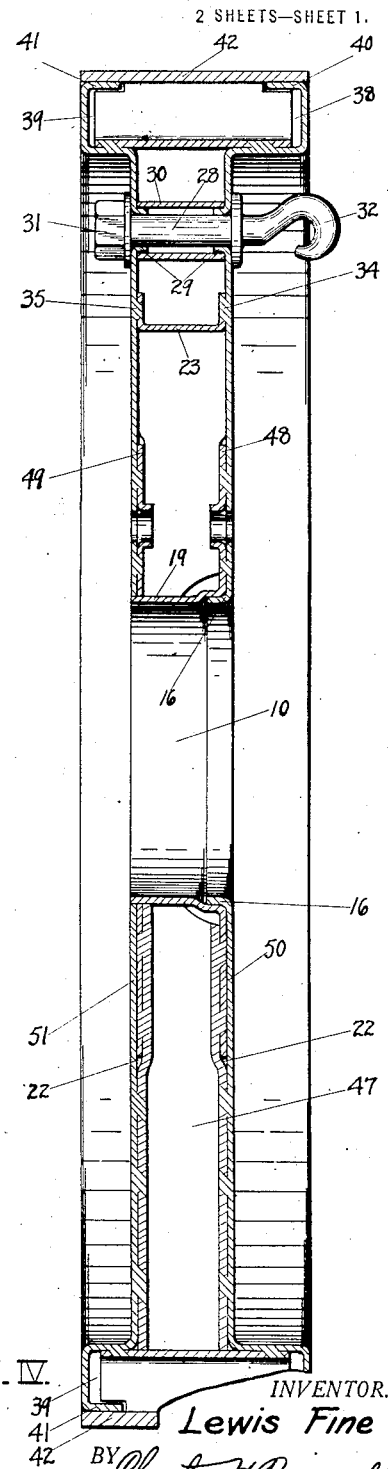
Fig. IV.
INVENTOR.
Lewis Fine
BY Chester H. Braselton
ATTORNEY

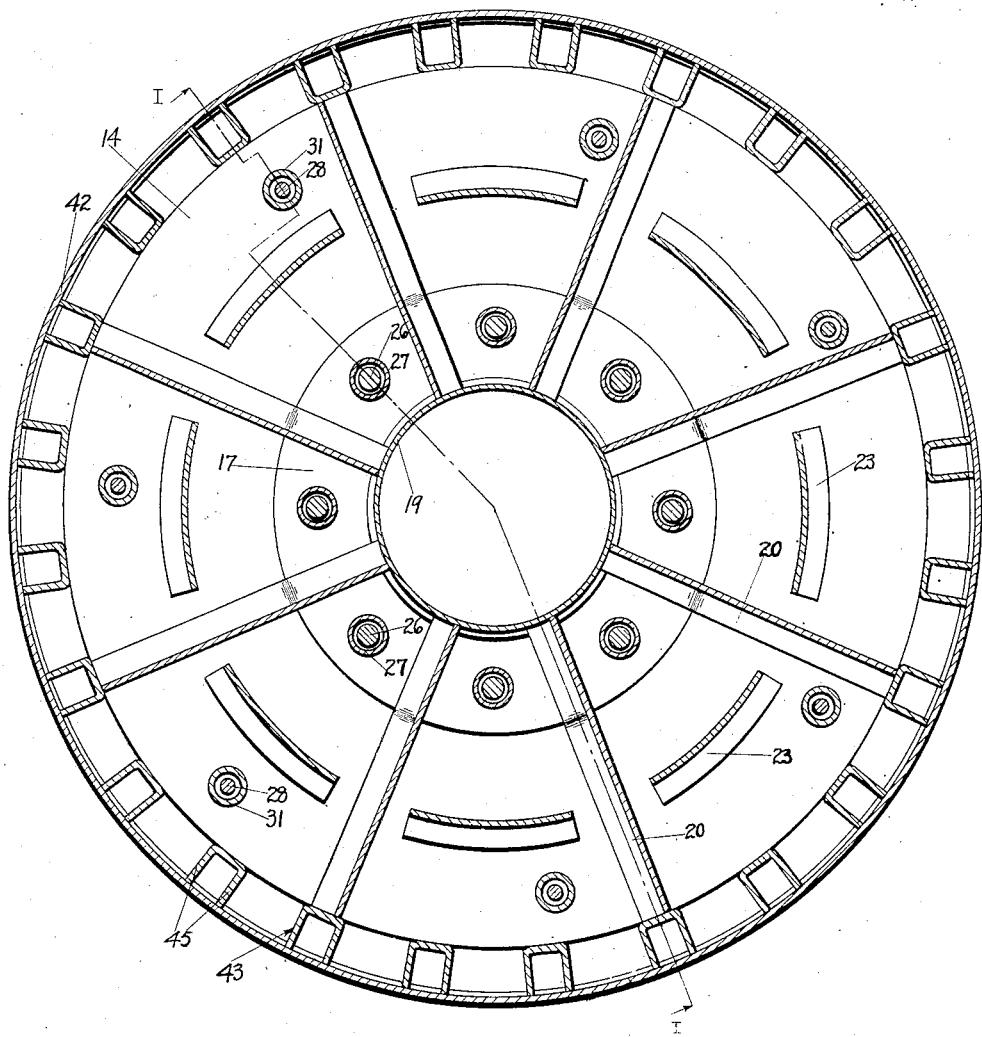

UNITED STATES PATENT OFFICE.

LEWIS FINE, OF PHILADELPHIA, PENNSYLVANIA, ASSIGNOR, BY MESNE ASSIGNMENTS, TO BUDD WHEEL COMPANY, OF PHILADELPHIA, PENNSYLVANIA, A CORPORATION OF PENNSYLVANIA.

METAL WHEEL STRUCTURE.

1,404,283. Specification of Letters Patent. Patented Jan. 24, 1922.

Application filed May 12, 1919. Serial No. 296,624.

*To all whom it may concern:*

Be it known that I, LEWIS FINE, residing at Philadelphia, in the county of Philadelphia and State of Pennsylvania, have invented certain new and useful Improvements in Metal Wheel Structures, of which I declare the following to be a full, clear, and exact description.

This invention relates to improvements in metal wheels, being particularly directed to the type of wheel commonly known as disc wheels.

One object of the invention is to construct metal wheels of the character described, which are efficient, strong, durable, economical of manufacture, and easily assembled.

Further objects of the invention relate to economies of manufacture and details of construction, as will hereinafter appear from the detailed description to follow.

The objects of the invention are accomplished in one instance by the devices and means described in the following specification, but it is evident that the same may be varied widely without departing from the scope of the invention as pointed out in the appended claims.

A structure constituting one embodiment of the invention, which may be the preferred, is illustrated in the accompanying drawings forming a part hereof, in which:

Figure I is a tranverse sectional view of a wheel structure which is particularly adapted for use as a rear wheel, taken along the line I—I of Figure II, and illustrating the relative position of the various parts of the wheel structure.

Figure II is a longitudinal, vertical sectional view, taken along the line II—II of Figure I, and illustrating the position of the various bracing members with respect to each other and the wheel discs.

Figure III is a perspective view of one of the channel shaped cross braces employed in the construction of the wheel.

Figure IV is a transverse sectional view, illustrating a slightly modified form of wheel structure which is particularly adapted for use as a front wheel and from which the hub portion is omitted.

In the drawing, similar reference characters refer to corresponding parts throughout the several views, and the sectional views are taken looking in the direction of the small arrows at the ends of the section lines.

In general, the invention comprises a novel form of disc wheel, which is adapted to be made up of a plurality of parts suitably connected together in such a manner as to provide an exceedingly strong and rigid structure, and the invention comprises novel bracing means and securing devices employed in securing the several parts together so as to provide an efficient wheel structure.

In the embodiment of the invention illustrated in Figures I to III, the hub portion 10 of the wheel is provided with an outwardly extending annular flange 11, which is adapted to bear against one side of the body portion of the wheel, while a brake drum 13 formed with a central opening therein is adapted to be sleeved over one end of the hub in such a manner as to bear against the opposite side portion of the wheel structure and be secured thereto and to the annular flange 11 in any suitable manner. The main portion of the wheel comprises a pair of wheel discs 14 and 15, each of which is provided with a central opening formed therein within which is adapted to be positioned the hub 10 when the parts are in assembled position. The outer wheel disc 14 is provided with an annular flange 16 surrounding the central opening formed therein, said flange being adapted to bear against the exterior surface of the hub. Outer and inner circular plates 17 and 18, each of which is provided with a central opening therein, are adapted to be positioned in proximity to the outer and inner wheel discs 14 and 15 respectively, being located in such a manner that the central openings formed therein register with the central openings formed in the outer and inner wheel discs. A plurality of radially extending U-shaped braces 20 are positioned between the inner and outer wheel discs in such a manner as to extend outwardly from the hub in a radial direction.

The plate 17 is provided with an annular flange 19 adjacent the central opening formed therein, said flange extending laterally beneath the inner ends of the radially extending braces 20, and within the central opening formed in the inner plate 18 when the parts are in assembled position. Each of the radially extending U-shaped braces 20 is provided with an inner end portion of greater width than the outer portion thereof, as illustrated in Figure I, and the inner wheel disc 15 is provided with a slightly offset portion as indicated at 21 to accommodate the enlarged portions of the radial braces. Each of the radial braces is slightly recessed towards the inner end thereof as indicated at 22 to provide a circular space for the reception of the outer plate 17. A curved U-shaped brace 23 is positioned within the space between each pair of adjacent radially positioned braces substantially midway between the hub and the rim portion of the wheel, the curved braces being positioned in such a manner that the curve is substantially concentric with the axis of the wheel.

The inner and outer plates 17 and 18 are provided with a plurality of registering openings formed therein, each of said openings being spaced a slight distance from the central opening formed in each of these plates, and an annular flange 25 is formed in such a manner as to surround each of these openings formed in the plates 17 and 18, the annular flanges 25 being so positioned as to extend inwardly from the plates towards the central longitudinal plane of the wheel. These openings are adapted to register with each other and with similar openings formed in the wheel discs and in the annular flange 11 of the hub, and radial portion of the brake drum for the purpose of receiving securing bolts 26, which are passed through the openings in such a manner as to assist in securing the several parts of the wheel structure together. A tubular member 27 is positioned between the opposite plates 17 and 18 in such a manner as to receive each of the bolts 26, the said tubular members 27 being of sufficient size to fit over the flanges 25, and the tubular members 27 serve as strengthening means for assisting in securing the plates 17 and 18 in position relative to the wheel discs 14 and 15 in proper position relative to each other. The wheel discs 14 and 15 are provided with a series of radial openings positioned outward radially from the openings previously described, the said discs being positioned in such a manner as to permit the corresponding openings formed therein to register with each other in such a manner as to receive bolts 28 therein for the purpose of assisting in retaining those portions of the wheel discs in proper position relatively to each other. An inwardly extending flange 29 is formed in each of the wheel discs surrounding the last named openings in a manner similar to that in which the flanges 25 formed in the plates 17 and 18 surround the openings formed therein. A tubular spacing member 30 is positioned between the opposite wheel discs 14 and 15, in such a manner as to surround the bolts 28 and fit over the annular flanges 29. The bolts 28 are each provided with a nut 31 threaded upon one end thereof, and the opposite end of each bolt 28 is provided with a hook 32 adapted to be employed for the purpose of securing anti-skid devices to the exterior surface of the wheel.

In the assembling of the wheel structure, the outer wheel disc 14 may be laid flat upon a suitable support with the outer circular plate 17 assembled in proximity thereto. The radial braces 20, curved braces 23, and tubular members 27 and 30 are then preferably placed in position when the inner circular plate 18 and inner wheel discs 15 may be applied. The various parts are so arranged in the process of assembling that the corresponding openings formed in the various members register with each other in such a manner as to suitably receive the connecting bolts 26 and 28. The outer wheel disc 14 may be secured to the circular plate 17, and the radial braces 20 and the curved braces 23 by being spot welded thereto as indicated at 34. In a similar manner the inner wheel disc 15 may be secured to the inner circular plate 18, the curved braces 23 and the radial braces 20 by being spot welded thereto as indicated at 35. In this manner the various parts of the wheel structure are firmly and securely attached together in such a manner as to provide a rigid structure, which is capable of withstanding the various strains to which it may be subjected. The wheel unit may then be mounted on the hub and the brake drum positioned thereon, as shown in Figure I, the several securing bolts 26 and 28 being then positioned within the corresponding openings provided therefor, and drawn up so as to secure the wheel on the hub and serve as an additional securing means for the purpose of retaining the several parts of the wheel structure in proper position relative to each other.

The wheel discs 14 and 15 are provided with channel portions 38 and 39 positioned adjacent the outer edges thereof, these channel portions being adapted to register with each other in such a manner as to form a continuous channel extending around the circumferential portion of the wheel. The wheel discs 14 and 15 are each provided with an inturned peripheral flange 40 and 41 respectively, which flanges form one of the side walls of the channel portions, and serve as a support for the rim 42. A plurality of channel shaped cross braces 43 are adapted to be positioned within the channel portions 38 and 39 of the wheel discs in such a manner as to extend in a direction substantially parallel to the axis of the wheel, and assist the peripheral flanges in supporting the tire 42. Each of the channel shaped cross braces 43 is provided with a base portion 44, which is adapted to rest upon the outer portions of the wheel discs and be secured thereto by spot-welding as indicated at 44'. Each of the channel shaped cross braces 43 is provided with a pair of outwardly extending walls 45 positioned at right angles to the base portion 44, and when assembled in position in the wheel structure they extend in a radial direction towards the periphery of the wheel. Each of these wall portions 45 is provided with a central projection 46, which extends outwardly from the remaining portion of the wall, and is positioned between the inner edges of the inturned flanges 40 and 41 and extend outwardly a sufficient distance to be substantially flush with the outer surface of these flanges. When the rim or tire 42 is positioned upon the outer portion of the wheel rim formed of the inturned flanges 40 and 41 and the outwardly projecting portions 46 of the channel shaped cross braces, it bears against these portions and is supported thereby.

In the form of wheel illustrated in Figure IV, which is adpted to be employed as a front wheel for a truck or tractor, the various parts are in all respects similar to that previously described except that the radially extending brace members 47 are somewhat narrower at both sides adjacent their inner ends in order to provide space for the reception of the circular plates 48 and 49 between the outer sides of the braces and the inner sides of the corresponding wheel discs.

In the form illustrated in Figure IV, it will be noted also that the wheel discs 50 and 51 contain no offset portions, but are substantially straight throughout their entire radial extent, which construction is permitted by reason of the fact that the radial braces 47 are provided with narrowed portions upon both sides thereof adjacent their inner ends for the accommodation of the circular plates.

While I have shown and described in considerable detail a specific embodiment of my invention, it is to be understood that this showing and description is illustrative only and for the purpose of rendering my invention more clear, and that I do not regard the invention as limited to the details of construction illustrated or described, nor any of them, except in so far as I have included such limitation within the terms of the following claims in which it is my intention to claim all novelty inherent in my invention broadly as well as specifically.

What I claim as new and desire to secure by Letters Patent is:

1. In a wheel structure, a pair of wheel discs, a plurality of V-shaped radial braces positioned between the discs, the sides of said U-shaped braces lying against and secured to said discs, and curved braces located between adjacent radial braces, said curved braces being concentric with the axis of the wheel.

2. In a wheel structure, a pair of wheel discs, a plurality of radial braces between the wheel discs, a plurality of curved braces positioned between the wheel discs and between adjacent radial braces, members for securing the wheel discs together and tubular means surrounding certain of the securing members and spacing the wheel discs from each other.

3. In a wheel structure, a pair of wheel discs provided with registering openings, an annular flange surrounding each opening, securing members extending through the registering openings, and tubular members surrounding certain of the securing members and spacing the wheel discs from each other, the ends of said tubular members embracing the adjacent annular flanges.

4. In a wheel structure, a pair of wheel discs provided with registering channels, and a plurality of channel shaped cross braces having their opposite ends positioned within the registering channels.

5. In a wheel structure, a pair of wheel discs provided with channel portions and peripheral flanges, and a plurality of channel shaped cross braces having their opposite ends positioned within the channeled portions of the discs, and having extensions projecting between the adjacent edges of the flanges.

6. In a wheel structure, a pair of wheel discs provided with inturned peripheral flanges, a plurality of channel shaped cross braces supported by the wheel discs, and having portions located between the adjacent edges of the flanges.

7. In a wheel structure, a pair of wheel discs provided with registering channel portions adjacent their peripheries, a plurality of radial braces positioned between the wheel discs, and a channel shaped cross brace positioned upon the outer end of each radial brace, and having its ends located in the registering channels in the wheel discs.

8. In a wheel structure, the combination of a spider unit including a plurality of radially extending braces and a central sleeve against which the inner ends of said braces abut, a pair of wheel discs connected together against the sides of said braces, a plurality of curved reinforcing members, concentric with said wheel discs, disposed between the radial braces, and a rim mounted on the periphery of said wheel discs.

9. In a wheel structure, the combination of a spider unit including a plurality of radially extending arms, a pair of wheel discs connected together against the sides of said arms, a plurality of curved reinforcing members disposed between said discs and concentric therewith, a plurality of transverse reinforcing members carried by said discs adjacent their periphery, and a rim mounted on the periphery of said discs.

In testimony whereof, I affix my signature.

LEWIS FINE.